No. 822,612. PATENTED JUNE 5, 1906.
A. KING.
NAILLESS HORSESHOE.
APPLICATION FILED JULY 19, 1905.
2 SHEETS—SHEET 1.
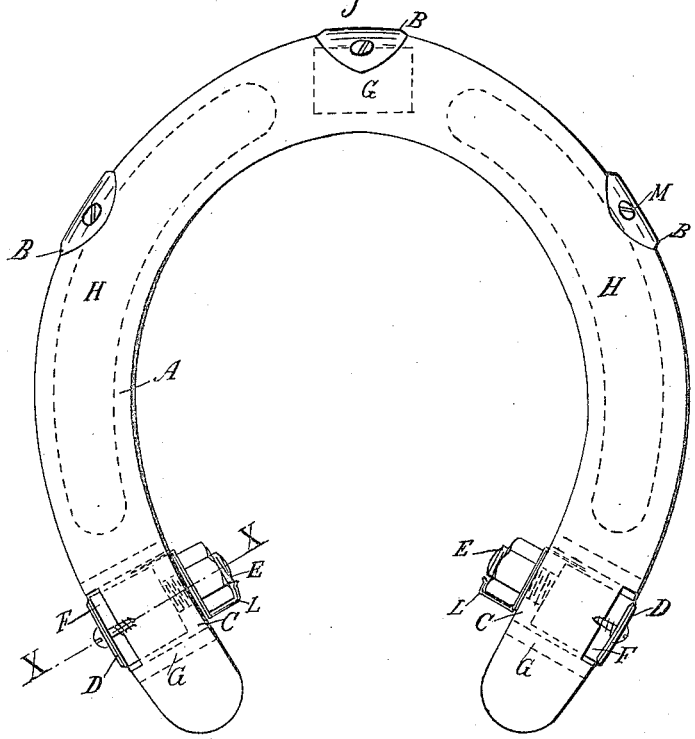
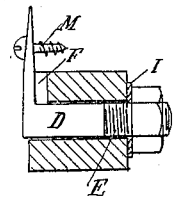
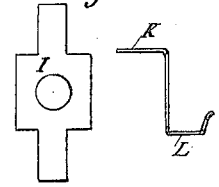
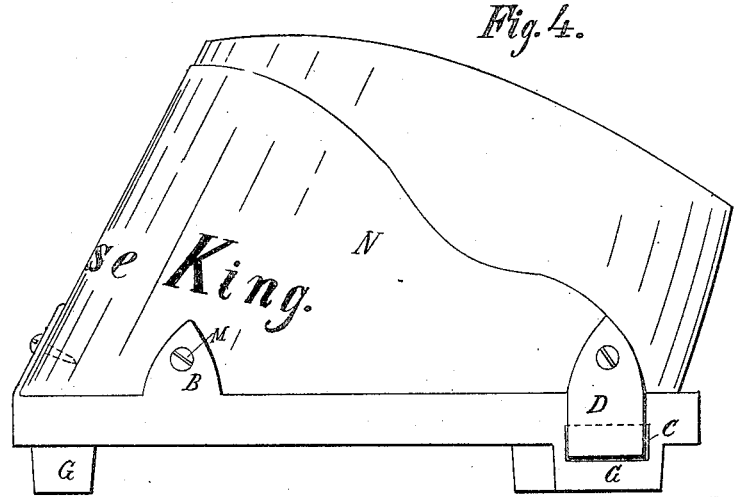
WITNESSES:
Fred Gaubatz
Elfrieda Behrens
INVENTOR
Alphonse King,
BY
Emil Behrens
his Attorney No. 822,612. PATENTED JUNE 5, 1906.
A. KING.
NAILLESS HORSESHOE.
APPLICATION FILED JULY 19, 1905.
2 SHEETS—SHEET 2.
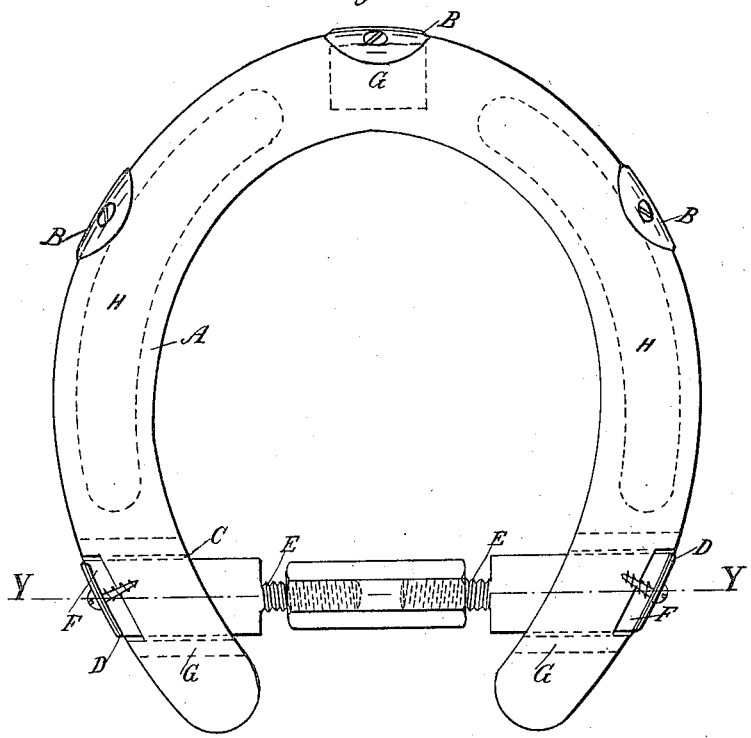
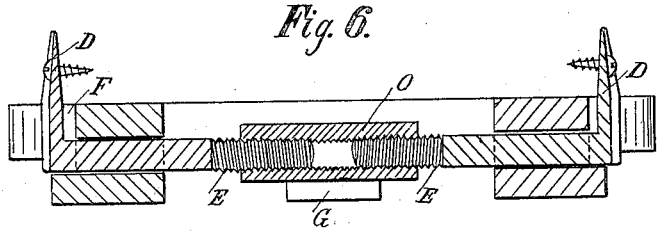
WITNESSES:
Fred Gaubatz
Elfrieda Behrens
INVENTOR
Alphonse King.
BY Emil Behrens
his Attorney

UNITED STATES PATENT OFFICE.

ALPHONSE KING, OF SAN ANTONIO, TEXAS.

NAILLESS HORSESHOE.

No. 822,612.     Specification of Letters Patent.     Patented June 5, 1906.

Application filed July 19, 1905. Serial No. 270,354.

*To all whom it may concern:*

Be it known that I, ALPHONSE KING, a citizen of the United States of America, and a resident of San Antonio, in the county of Bexar and State of Texas, have invented certain new and useful Improvements in Nailless Horseshoes, of which the following is a specification.

My invention relates to improvements in nailless horseshoes, in which a solid horseshoe is provided with upward-extending lugs or ears bent inwardly to fit the shape of the hoof and having at its heel ends transverse angular holes. Corresponding angular shanks pass through these holes, having on one end upward lugs or ears bent inwardly to fit the shape of the hoof and the other end screwbolts. By means of screwing the nuts to the bolts these upright heel lugs or ears are pressed against the hoof, and as the hoof is very much beveled in the front part the upward lugs or ears at the front of the shoe hold the same firm up to the hoof, and as the heel being the narrowest part of the hoof this prevents the shoe slipping forward on the hoof after the heel lugs or ears are screwed tight to the shoe and hoof.

The object of my invention is to furnish a light adjustable horseshoe which can easily be put on by any person without the use of nails and removed when required. I attain this object by the device illustrated in the accompanying drawings, in which—

Figure 1 is a top view of the entire horseshoe. Fig. 2 is a section on line X X of Fig. 1. Fig. 3 is a plan and side view of the locking device of the nut. Fig. 4 is a side view of the shoe attached to a hoof and showing an ornamental name-plate. Fig. 5 is a top view of the shoe of a modified construction, and Fig. 6 is a section on line Y Y of Fig. 5.

Similar letters refer to similar parts throughout the several views.

A is a horseshoe of the common shape and size, having at the front part three upward lugs or ears B, bent inwardly to fit the bevel of the hoof, and at the heel transverse angular holes C to receive the shanks of the clamping lugs or ears D, which are formed at their inner ends into screw-bolts E. At the upper outside wall of the angular holes C is a recess F to allow the lugs D to press against the hoof when the nuts are screwed on the bolts E.

G represents calks of the usual size. On the face of the shoe are longitudinal grooves H to reduce the weight of the shoe.

To prevent the nuts from coming loose on the bolts E, a square washer I is provided, having tongues on two opposite sides. One tongue K is bent down, as shown in Fig. 3, and is placed on the bolt before the nut is screwed on. When the nut is screwed up tight, the other tongue L is bent up close against the nut, whereby the same is locked. Should it be desired that a name-plate N ornament the hoof, the same is screwed to the hoof by small wood-screws M, screwed through the lugs B D and the name-plate and into the hoof.

Figs. 5 and 6 show a modified construction of my horseshoe, in which the bolts E, having right and left hand threads, respectively, are tightened by a right and left hand nut O instead of having separate nuts.

Having fully described my invention, what I claim as my invention, and desire to secure by Letters Patent, is—

1. The combination with a horseshoe having at its front part upwardly and inwardly extended lugs and having calks at the heels and a hole at each of said calks extending horizontally through the shoe, of clamping-lugs having shanks fitted for longitudinal adjustment in said holes, and means on said shanks for tightening the clamping-lugs upon a hoof.

2. The combination with a horseshoe having at its front part upwardly and inwardly extended lugs and at the heels holes extending horizontally through the shoe, of clamping-lugs having shanks fitted for longitudinal adjustment in said holes, means on said shanks for tightening the clamping-lugs upon a hoof, a name-plate conformed to a hoof and fitted to the shoe for location thereon between said lugs and the hoof, and screws passing through said lugs and name-plate and of sufficient length to enter the hoof.

3. The combination with a horseshoe having at its front part upwardly and inwardly extended lugs and, at the heels, holes extending horizontally through the shoe, of a clamping-lug for each heel having a shank fitted for longitudinal adjustment in the hole in its respective heel and terminated by a screw-thread portion and a right-and-left nut joining said lugs for tightening them upon a hoof.

Signed at San Antonio, Texas, this 12th day of July, 1905.

ALPHONSE KING.

Witnesses:
EMIL BEHRENS,
W. A. J. ROACH.